Patented Oct. 31, 1950

2,527,785

UNITED STATES PATENT OFFICE 2,527,785

BUTTER FLAVORING COMPOSITION

Jack W. Armstrong, Chicago, Ill., assignor to Food Technology, Inc., Chicago, Ill., a corporation of Illinois No Drawing. Application August 21, 1948, Serial No. 45,571

5 Claims. (Cl. 99—140)

This invention relates in general to the flavoring of foods, and in particular to an artificial butter flavoring composition.

The flavoring components of butter have long been essential in the preparation of food products having desirable taste characteristics. These natural occurring flavoring components were isolated and identified by the early chemists as being essentially butyric acid and esters thereof. It was found that butyric acid and esters thereof present in minute quantities imparted a sharpness to food products which was very desirable. With the advent of large scale food processing methods such as baking and candy making, the use of butter has been supplanted by the use of other shortening compositions which supply the required fats for the food processing. In order to achieve the desirable taste characteristics of the butter flavoring compounds it has become necessary to add synthetic flavoring ingredients to foods. Butyric acid and the esters of butyric acid have been employed in a large number of processes in which butter was formerly used. Butyric acid and its esters have certain limitations which make their use in food products rather difficult. First of all, the amount of the compounds must be very carefully controlled because only a very small quantity may be employed. Butyric acid in particular must be used in minute quantities because too large a concentration makes the food product very undesirable to taste. The taste and odor of rancid butter becomes very strong when only a very small quantity of butyric acid is used.

A further serious limitation on the use of butyric acid and its esters is the high volatility of these materials. At the temperatures ordinarily encountered in baking or candy making, the butyric acid and the esters thereof are very rapidly volatilized and lost. In fact, heat of any sort will cause a rapid loss of these compounds.

It is an object of this invention to provide butter flavors which remain stable upon heating and are not readily volatilized.

Another object of this invention is to provide a method for uniformly dispersing the butter flavoring components throughout a food composition.

A further object of this invention is to provide an artificial butter flavoring composition which will slowly disassociate in such a way as to provide a steady source of flavoring for a food product.

These and other objects and advantages will become more apparent from the following examples and description.

According to the present invention, butter flavor components are added to food compositions in the form of non-volatile salts of butyric acid which disassociate slowly upon introduction into an acid medium. The use of non-volatile salts prevents volatilization of the flavoring compositions during the heating of the foods. Hence, the butter flavoring compound is not baked off by the heat of baking operations, nor is it lost during the processing of candies. Gradual hydrolysis of butyric acid salts in which a uniform amount of butyric acid is released slowly over a considerable length of time is accomplished by buffering the salts to keep them slightly on the alkaline side until they are introduced into food compositions which are acid in nature.

A typical butter flavor mix is composed of the esters of butyric acid, higher fatty acids, such as the homologues of butyric acid containing 5, 6, 7, or 8 carbon atoms, various essential oils such as oil of bitter almond and carriers or fillers, such as starch, flour, or sugar. Such a typical butter flavor mix very readily loses its flavoring ability when heated, as in the case of baking or cooking. It has now been found that an artificial butter flavor concentrate which contains the non-volatile salts of butyric acid retains its flavoring characteristics throughout the entire food processing operation. As an example of a butter flavor concentrate which is quite stable to heating, I may prepare a concentrate according to the following formula:

| | Percent by weight |
|---|---|
| Flavors and essential oils | 59.15 |
| Higher fatty acids | 10.00 |
| Esters of butyric acid | 23.00 |
| Sodium butyrate | 7.70 |
| Buffer salts | 0.15 |

The concentrate shown above is only a preferred embodiment of the invention which contemplates the addition of the butyric acid salts in a wide range of concentrations depending upon the use to which the flavor is to be put. It is feasible to employ from 3% to 40% by weight of butyric acid salts in the concentrate formula outlined above. Since the butyric acid salts are so strong as to ruin the flavor of food if employed in too large amounts, it becomes necessary to control the addition of salts carefully and to achieve thorough dispersion throughout the food product. It has been found desirable, therefore, to incorporate the concentrate shown above into a butter flavor mix which cotnains from 0.25% to 5% by weight of the butter flavor concentrate and 95% to 99.75% by weight of a filler or carrier such as starch, flour, or sugar. The concentrate and the filler are very thoroughly mixed to insure complete dispersion of the butyric acid salts throughout the mix. A preferred mix may be compounded using 1% butter flavor concentrate and 99% filler.

The butter flavor mix which contains only a very small amount of butyric acid salts intimately mixed therewith may be incorporated into any type of food composition where it is desirable to achieve the butter flavor. For example, a typical pound cake may be made up according to the following formula:

*Pound cake formula*

350 grams flour
350 grams sugar
210 grams shortening
20 grams milk powder
10 grams salt
130 grams water
218 grams eggs Sift flour twice. Place all ingredients in large mixing bowl. Mix on low speed one minute and scrape well. Mix on second speed five minutes and scrape. Mix on second speed five minutes longer and scrape. Finish mixing on second speed for two minutes. Do not scrape. Scale 2½ pounds into paper lined pans, very lightly creased, or lined with brown paper. Bake at 325 degrees F. for 1½ hours.

To the above formula should be added 12.8 grams of the butter flavor mix containing filler. This is approximately 1% butter flavor mix based on the weight of the pound cake formula before baking. In this example it has been found that the butyric acid salts do not volatilize to any extent, and further, that they have an inhibiting effect upon the volatilization of the butyric acid esters. Hence, the butter flavor components remain substantially the same throughout the processing and baking operations. The pH of the cake formula is slightly below 7 and this acidity causes gradual hydrolysis of the butyric acid salts throughout the processing operation. It will be noted that hydrolysis of the salts was prohibited by use of the buffer component until the salts came into contact with the slightly acid cake formula. It will be apparent that the buffer employed must be weak enough so that it will not prevent the change-over of the butter flavor concentrate to the acid side upon contact with cake batter.

The butter flavor concentrate may be employed as such or in the form of the filled mix in the flavoring of other food products in which a butter flavor is desirable. In addition to the pound cake described above, the butter flavor concentrate may be advantageously employed in white cakes, yellow cakes, sponge cakes, chocolate cakes and devils food cakes, in yeast fermented dough, bread and rolls, in candies and other confections, cookies, crackers and the like. It is only essential that the food product be slightly acid (say pH 6 to 7) in nature to effect hydrolysis of the salts of butyric acid.

While the butyric acid salts are preferably employed in concentrates and mixes, as previously described, it should be understood that they may be added directly to the food composition without undesirable results. When directly added, it should be kept in mind that the butyric acid salts must be thoroughly dispersed throughout the entire food product in order that local high concentrations will not spoil the taste of the food. Sodium butyrate and potassium butyrate are the most readily available of the butyric acid salts. They are not, however, the only ones which may be employed. Any of the salts of butyric acid which are soluble in water to any decree may be advantageously used provided that they are hydrolyzable in a slightly acid medium. The esters of butyric acid, as contemplated by this invention, include any of the products of the reaction of aliphatic alcohols with butyric acid. A number of buffers may be employed which will give the desired results, e. g., will maintain a pH of between 7 and 8. For example, disodium acid phosphate may be advantageously employed as well as sodium bicarbonate and sodium citrate.

Because of the extreme strength of the butyric acid salts, it is necessary to employ only very minute quantities of them in achieving a desirable butter-like flavor. The percentages are so small that it is desirable to express them in terms of parts per million of salt based upon the total weight of the food product. Hence, it has been found that as little as 1 part per million of butyric acid salts may be appreciably effective in imparting a butter-like flavor to certain types of bakery products, as, for instance, white cakes. It has likewise been found that up to 60 parts per million of butyric acid salts may be employed in other food products without causing a rancid flavor in the food. As a preferred example it has been found that about 7 parts per million of sodium butyrate gives a very desirable butter-like flavor in the pound cake formula disclosed above. It will be observed that the concentration of butyric acid salts is based upon the total weight of the food product. The concentrations have been expressed in this fashion because the manner of introduction is not critical so long as the proper proportion of butyric acid salt to food product is observed. In the pound cake formula the sodium butyrate is added in the proportion of 7 parts per million or 0.0007% by weight of the pound cake formula. Another way of expressing this is to add 0.0096 gram sodium butyrate to the pound cake formula, or 0.128 gram of butter flavor concentrate as shown in a previous example, or 12.8 grams of a butter flavor mix containing filler, a preferred example of which is shown above.

It will be apparent from the above disclosure that the present invention provides a new and novel butter flavor composition which has the desirable characteristics of being essentially non-volatile and which slowly imparts the butter flavor to the food product. The new butter flavor may readily be compounded into a number of compositions which are easily applied to food products.

The invention is hereby claimed as follows:

1. The method of flavoring food products which comprises intimately mixing therewith from 1 to 60 parts per million of sodium butyrate.

2. A butter flavor composition for use in flavoring food products which comprises essential oils, butyric acid esters, higher aliphatic acids, a buffer, and from 3% to 40% by weight of non-volatile butyric acid edible salts which are hydrolyzable in acid medium.

3. The method of flavoring food products which comprises intimately mixing therewith a quantity of a hydrolyzable non-volatile butyric acid edible salt sufficient to impart a butter flavor thereto.

4. Bakery products prepared from acidic doughs and batters containing from 1 to 60 parts per million of sodium butyrate.

5. Food products prepared from acidic doughs and batters containing from 1 to 60 parts per million of hydrolyzable non-volatile edible salts of butyric acid.

JACK W. ARMSTRONG.

REFERENCES CITED

The following references are of record in the file of this patent:

UNITED STATES PATENTS

| Number | Name | Date |
|---|---|---|
| 2,326,134 | Freilich et al. | Aug. 10, 1943 |

FOREIGN PATENTS

| Number | Country | Date |
|---|---|---|
| 226,537 | Great Britain | Dec. 15, 1924 |
| 20,902 | Australia | Jan. 11, 1935 |

OTHER REFERENCES

"The Chemical Senses," by Moncrieff-Leonard Hill, Limited, 17 Stratford Place, W. 1, London, 1944, pages 97 and 187.